Oct. 21, 1969 M. J. JACOBSON ET AL 3,473,960
SURFACE FINISHING OF MAGNETIC TAPE BY SOLVENT EXCHANGE
Filed Dec. 12, 1966
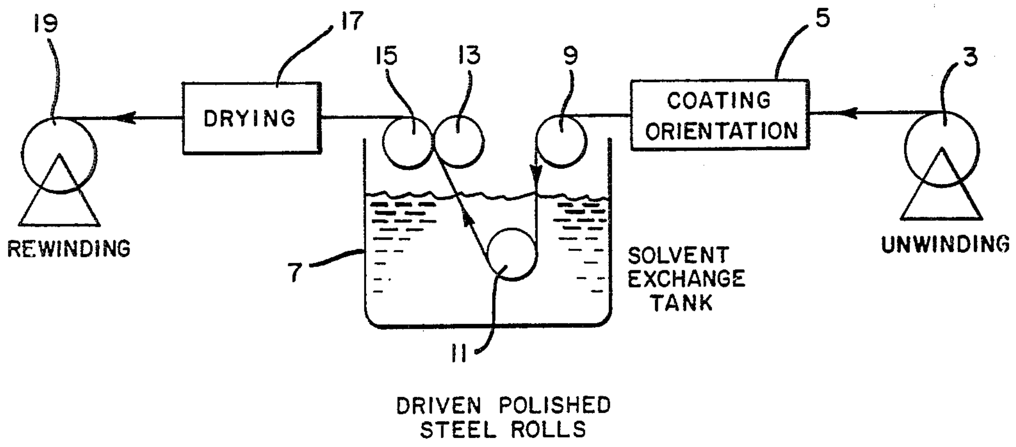
INVENTORS
MORTON J. JACOBSON
STEN E. LUNDGREN
BY Robert G. Clay
ATTORNEY 3,473,960

SURFACE FINISHING OF MAGNETIC TAPE BY SOLVENT EXCHANGE

Morton J. Jacobson, San Carlos, and Sten E. Lundgren, Redwood City, Calif., assignors to Ampex Corporation, Redwood City, Calif., a corporation of California Filed Dec. 12, 1966, Ser. No. 600,803
Int. Cl. B05c 3/02; B44d 1/44
U.S. Cl. 117—237 5 Claims

ABSTRACT OF THE DISCLOSURE

A magnetic tape having a smooth surface is produced by immersing freshly coated tape in a solvent which is miscible with the solvent of the tape binder but which is not a solvent for the resin used in the tape coating thus forming a skin on the surface of the tape, permitting one to apply a smoothing pressure on the skin of the tape.

It is well known that the surface finish of magnetic recording media such as tapes is highly important. If the surface of the tape is not smooth, it leads to irregular response characteristics such as noise and lack of short wavelength response. This is particularly important when the tape is used for exacting purposes such as wide band video or data recording. Many methods have been suggested in the past for improving the surface finish of magnetic tapes such as calendering operations wherein the tape is passed between high pressure rollers which may or may not be heated and mechanical abrasion methods such as polishing and burnishing. However, none of these methods has proved completely satisfactory because they operate on the tape after the resinous binder which holds the magnetic particles to the base material is in a hardened condition. Further, although such methods may be effective when applied at low speeds under laboratory conditions, they are frequently unsatisfactory when they are carried out under normal manufacturing conditions.

It is an object of the present invention to provide a method of producing a magnetic recording medium having a superior surface finish.

Another object of this invention is to provide a method of producing a magnetic recording medium wherein the medium is given a superior finish prior to drying of the coating, i.e., while the binder resin is still in a liquid or viscous form.

Still another object of this invention is to provide a highly economical method and apparatus for imparting an extremely smooth surface to a magnetic recording medium which is suitable for high speed production runs.

Other objects will be apparent from the balance of the specification.

In general, the objects of the present invention are accomplished by starting with a freshly coated magnetic tape wherein magnetic particles are held in a suspended condition in a resinous binder containing a solvent so that the resinous binder is still in a semi-fluid or plastic condition. The freshly coated tape is then passed through a suitable solvent whereby there is a solvent exchange with the solvent of the resinous binder. This solvent exchange produces thin film or skin of the resinous binder on the surface of the tape while most of the resinous binder underlying the skin is in a fluid condition. The tape is immediately passed under at least one highly finished roller to impart a good surface finish on the tape. The tape is then dried in the usual manner.

The sole figure of the drawing illustrates, partially in diagrammatic form, apparatus suitable for carrying out the present invention.

Referring now to the drawings by reference characters, a reel of base stock 3 is unwound and passed through a coating and orienting apparatus 5. The coating step is well known to those skilled in the art and forms no part of the present invention and therefore is not described in detail. For example, the coating can be knife coating, offset coating, gravure coating or the like. During the coating step a dispersion is employed of finely divided magnetic particles held in a normally solid resinous binder to which a solvent has been added, rendering the mixture semi-fluid so that it can be applied to the base stock. Orientation may or may not be used and, if used, can be any of the orientation methods well known to those skilled in the art employing permanent magnets, electromagnets or pulsed magnetic fields.

The coated base stock with the still fluid coating thereon is immediately passed over the idler roller 9 into the tank 7 which contains a solvent having special characteristics hereinafter described in detail. It will be noted that only the back (uncoated) surface of the tape passes over the roller 9. In tank 7 the coated surface of the tape passes over the highly polished roller 11. This is possible since the tape has been in the solvent for some time before it reaches the roller 11 and therefore has at least partially acquired a degree of surface hardness. It will be apparent that the roller 11 aids in the smoothing operation and therefore contributes to the ultimate surface smoothness of the tape. The tape then preferably passes between the rollers 13 and 15 where pressure may or may not be applied, as is later described in detail, wherein the final surface finishing normally takes place. In a less preferred embodiment of the invention roller 13 is not used. The tape is then passed into a drying oven 17, of the usual design and is then ordinarily rewound on roll 19 although at this point the tape is in a finished condition and might be sent directly to slitting and reeling operations or the like.

As has been previously mentioned, the solvent in tank 7 must have special characteristics and these characteristics are two in number. In the first place, the solvent in the tank 7 must be miscible to some degree with the solvent which is used to liquify the resin which forms the tape binder composition. In the second place, the solvent in tank 7 must be to some extent a non-solvent for the resin. Thus, as the tape passes into the tank 7, there is some solvent exchange at the surface of the tape between the solvent in the tank and the solvent of the tape binder. When this exchange takes place, a hardness or skinning takes place on the surface of the tape since the solvent absorbed on the surface of the tape and exchanged with the solvent of the tape is a non-solvent for the resin, leaving a small amount of partly hardened resin on the surface. It is this semi-hardened surface which enables one to immediately pass the tape under one or more rollers.

The usual solvents for lacquer type tape binders are highly polar compounds such as the ketones, including methyl ethyl ketone, methyl isobutyl ketone and acetone, aromatic compounds such as toluene and heterocyclic compounds such as tetrahydrofuran. These solvents are ordinarily used in combination and are highly effective in dissolving the usual tape binders. On the other hand, the solvents suitable for use in the present invention in tank 7 are ordinarily non-polar or slightly polar compounds which are miscible to some degree with the above identified solvents but which are very poor solvents or non-solvents with respect to the tape binder resin itself. Such solvents have low (maximum 108) kauri-butanol values and include the lower molecular weight alcohols such as ethanol and isopropanol, relatively pure hydrocarbons such as penthane, heptane, octane and the like and mixed hydrocarbon solvents such as those known as mineral spirits as well as aromatic hydrocarbon solvents. A particularly good solvent for use in tank 7 is a petroleum hydrocarbon known as odorless mineral spirit. This has an A.P.I. gravity of 60° F. of 54, an initial boiling point of 363° F., a 50% boiling point of 368° F. and an end point of 380° F. This solvent has a kauri-butanol value of 26. Although the aromatic hydrocarbon solvents can be employed under some conditions, they are not generally preferred since they have some tendency to dissolve the resinous binder system.

The following non-limiting examples illustrate various embodiments of the invention.

EXAMPLE I

A magnetic tape coating containing a polyurethane and vinylidene chloride-acrylonitrile binder was prepared by pebble milling for 72 hours with gamma ferric oxide, solvents and additives composed as follows:

| | Percent |
|---|---|
| Ferric oxide | 40.6 |
| Carbon black | 2.7 |
| Additives [1] | 3.0 |
| Vinylidene chloride-acrylonitrile copolymer | 3.3 |
| Polyurethane elastomer | 3.3 |
| Methyl ethyl ketone | 3.9 |
| Methyl isobutyl ketone | 3.9 |
| Toluene | 1.5 |
| Tetrahydrofuran | 37.8 |

[1] Additives comprise minor ingredients which enhance dispersion, stability and lubrication.

The above mixture was coated to a thickness of three mills on a polyester base stock and immediately passed through an apparatus as is shown in the drawing wherein the solvent in the tank 7 was heptane. Rollers 11, 13 and 15 were of highly polished steel having a surface finish of about 3 micro-inches RMS. A pressure of ¼ pound per lineal inch was applied between the rollers 13 and 15. A tape having a high degree of surface smoothness was obtained. The total dwell time in the solvent tank 7 was 0.5 second.

EXAMPLE II

The following coating mixture was used:

| | Percent |
|---|---|
| Ferric oxide | 24.7 |
| Additives | 2.1 |
| Vinyl chloride, vinyl acetate, vinyl alcohol terpolymer | 6.9 |
| Acrylonitrile butadiene rubber | 2.8 |
| Methyl ethyl ketone | 15.8 |
| Methyl isobutyl ketone | 9.5 |
| Toluene | 38.2 |

Utilizing a knife coater, the above composition was coated on an acetate base stock and immediately passed through the apparatus shown in the drawing. In this run, the solvent was sold under the trade name of Amsco Odorless Mineral Spirits and had a kauri-butanol value of 26 and an evaporation rate of 2.5 times that of acetone. Roller 13 was not used, so all smoothing was accomplished by roller 11. The dwell time in the tank was 0.2 second. A tape having a good surface finish was produced.

EXAMPLE III

A magnetic tape coating containing a vinylidene chloride-acrylonitrile copolymer binder was prepared by pebble milling for 72 hours a gamma ferric oxide coating, composed as follows:

| | Percent |
|---|---|
| Ferric oxide | 33.2 |
| Additives | 2.9 |
| Vinylidene chloride-acrylonitrile copolymer | 10.5 |
| Methyl ethyl ketone | 23.5 |
| Methyl isobutyl ketone | 10.9 |
| Toluene | 16.5 |

Utilizing a roller coater, a tape base stock was coated with this composition and immediately passed through the apparatus shown in the drawing wherein the solvent in the tank was isopropanol. The dwell time in the tank was 0.5 second and the roller 15 was of hard rubber while rollers 11 and 13 were of highly polished steel. The tape was then dried and found to have a good surface finish.

It is normally preferred to employ roller 13 and to exert some pressure between rollers 13 and 15. Suitable pressures range from 0 to 1 pound per lineal inch.

Suitable dwell times in tank 7 range from about $\frac{1}{10}$ to 5 seconds.

Although only a single roller is shown in tank 7, a plurality of rollers may be used in the tank.

We claim:

1. The method of producing a magnetic recording medium comprising:
   - (a) forming a dispersion of finely divided magnetic particles in a resin binder, said binder having a first solvent therein whereby the resin is rendered at least semi-fluid,
   - (b) applying said coating to a tape,
   - (c) immersing the thus coated tape in a second solvent, said second solvent being miscible with the first solvent but said resin being substantially insoluble in said solvent,
   - (d) permitting the coated tape to remain in said second solvent for a time sufficient to form a thin skin of said resin binder on the surface thereof,
   - (e) applying a smoothing pressure on said skin and
   - (f) drying the coated tape.
2. The method of claim 1 wherein said second solvent has a kauri-butanol value of not over 108.
3. The method of claim 1 wherein the base stock is withdrawn from the second solvent and passed between smooth rollers.
4. The method of claim 3 wherein the rollers are pressed together with a pressure of from greater than 0 to 1 pound per lineal inch.
5. The method of claim 1 wherein the base stock is in contact with the second solvent from $\frac{1}{10}$ to 5 seconds.

References Cited

UNITED STATES PATENTS

| | | | |
|---|---|---|---|
| 3,245,833 | 4/1964 | Trevoy | 117—63 X |
| 3,398,011 | 8/1968 | Neirotti et al. | 117—65.5 |

WILLIAM D. MARTIN, Primary Examiner

B. PIANALTO, Assistant Examiner

U.S. Cl. X.R.

117—63, 65.2, 235